UNITED STATES PATENT OFFICE.

ANTHONY L. FLEURY, OF TROY, NEW YORK, ASSIGNOR TO WILLIAM E. HAGAN, OF SAME PLACE.

IMPROVEMENT IN THE MANUFACTURE OF IRON.

Specification forming part of Letters Patent No. 39,991, dated September 15, 1863.

*To all whom it may concern:*

Be it known that I, ANTHONY L. FLEURY, of Troy, in the county of Rensselaer and State of New York, have invented a new and useful Improvement in the Manufacture of Iron and Steel from the Cinders of Puddling, Reheating, and Refining Furnaces, also applicable to their manufacture from certain kinds of ores; and I do hereby declare that the following is a full, clear, and exact description of the same.

To enable others skilled in the art to make and use my invention, I will proceed to describe the manner in which it is performed.

The cinder is to be first ground to powder in a mill such as is used for grinding plaster, or by any other suitable means, and is either mixed with the lime while the latter is undergoing the process of slaking, or is mixed in a dry state and afterward wetted and mixed up with water, as it is important that the cinder should be in contact with the lime while the latter is undergoing the slaking process or conversion into a hydrate, as in that state of transition the lime has a strong affinity for and will readily combine with silica, which is always present in large quantity in the cinder, and thus forms a double silicate of lime and iron. The proportion of lime to be mixed with the cinder, and the subsequent treatment, depend on the use which is to be made of the cinder, and I will proceed to describe some of its most important uses, and the manner in which they are effected.

First, as a substitute for the iron ore that is now used in admixture with pig-iron in puddling-furnaces. When used for this purpose, I mix with the pulverized cinder from ten to fifteen per cent., by weight, of powdered lime, and from ten to fifteen per cent. of clay, and, after having made the whole into a paste with water, form it in a press or by other means into bricks, slabs, or blocks, or other suitable pieces, which are then dried and fed into the puddling-furnace in the same manner as they are in proportions varying from ten to forty per cent., by weight, of the pig.

Second. For the extraction of its iron, as wrought-iron, or its manufacture into steel in the puddling-furnace, I add to the cinder from five to twenty-five per cent. of lime, according to the proportion of silica supposed to be present in the cinder, and grind both together till the whole is powdered, and then add, for the purpose of bringing the mixture to a stiff paste, sufficient water in which there has been dissolved chloride of sodium, chloride of calcium, chloride of potassium, chloride of iron, or other chlorine salt, in the proportion of from two to ten per cent., by weight, of the cinder. The paste thus formed is made into bricks, blocks, or slabs, and, after having been dried, is put into the furnace and treated like pig-iron.

Third. For working the cinders in a blast-furnace or cupola to produce pig-iron or cast-iron, I add to the last-specified mixture while in the pasty state, in the proportion of from twenty to twenty-five per cent. of the cinder, either coal-dust, wood, sawdust, tar-refuse, or coal-oil refuse. This mixture, after having been dried, is charged into the blast-furnace or cupola, and therein reduced to the condition for casting into pigs or other forms.

The last-described mixture may be treated in any air-furnace suitable for the conversion of iron into steel, and thereby made to produce a good quality of cast-steel.

Rich silicious ores may be treated with lime in either of the modes hereinabove described with reference to the cinder.

What I claim as my invention, and desire to secure by Letters Patent, is—

The use of the chlorine salts with the lime and cinder, in the manner and for the purpose substantially as herein shown and described.

ANTHONY L. FLEURY.

Witnesses:
N. DAVENPORT,
M. H. STRATTON.